United States Patent

Heiligenthal et al.

[15] 3,646,652
[45] Mar. 7, 1972

[54] ROLLER STRUCTURE

[72] Inventors: Harry E. Heiligenthal, Butler, Pa.; Arthur E. Nichols, Jr., Kalamazoo, Mich.

[73] Assignee: Dayco Corporation, Dayton, Ohio

[22] Filed: May 15, 1969

[21] Appl. No.: 824,927

[52] U.S. Cl. ............................................................. 29/130
[51] Int. Cl. ........................................................... B41n 7/00
[58] Field of Search ............. 29/130, 132; 264/45, 262, 264, 264/255

[56] References Cited

UNITED STATES PATENTS

| 1,161,756 | 11/1915 | Wolever | 264/262 X |
|---|---|---|---|
| 1,555,389 | 9/1925 | Stevens | 264/262 X |
| 2,685,548 | 8/1954 | Drozdowski | 29/130 X |
| 2,926,628 | 3/1960 | Black et al. | 29/123 X |
| 3,365,774 | 1/1968 | Kusters | 29/132 X |
| 3,435,500 | 4/1969 | Aser et al. | 29/130 |
| 3,449,548 | 6/1969 | Adamek et al. | 29/132 X |
| 3,475,803 | 11/1969 | Hill | 29/132 |
| 3,336,862 | 8/1967 | Brundige et al. | 29/132 |
| 620,286 | 2/1899 | Dodge | 264/45 |
| 3,238,086 | 3/1966 | Tompkins | 101/376 |
| 2,741,014 | 4/1956 | Hubbard | 29/130 |
| 3,254,599 | 6/1966 | Karlquist | 101/376 |
| 3,451,112 | 6/1969 | Karmell et al. | 29/130 |
| 3,514,829 | 6/1970 | Blatt | 29/130 |

*Primary Examiner*—Morris Kaplan
*Attorney*—Reuben Wolk

[57] ABSTRACT

A precision roll, having a substantially rigid core, an outer plastic sleeve, and filler means made of an elastic material and provided between the core and sleeve, whereby the plastic sleeve and filler means cooperate to enable the provision of a precision outside surface for the roll while assuring such outside surface has a resilient character.

2 Claims, 8 Drawing Figures

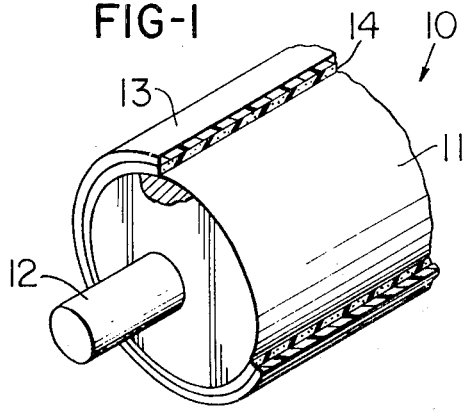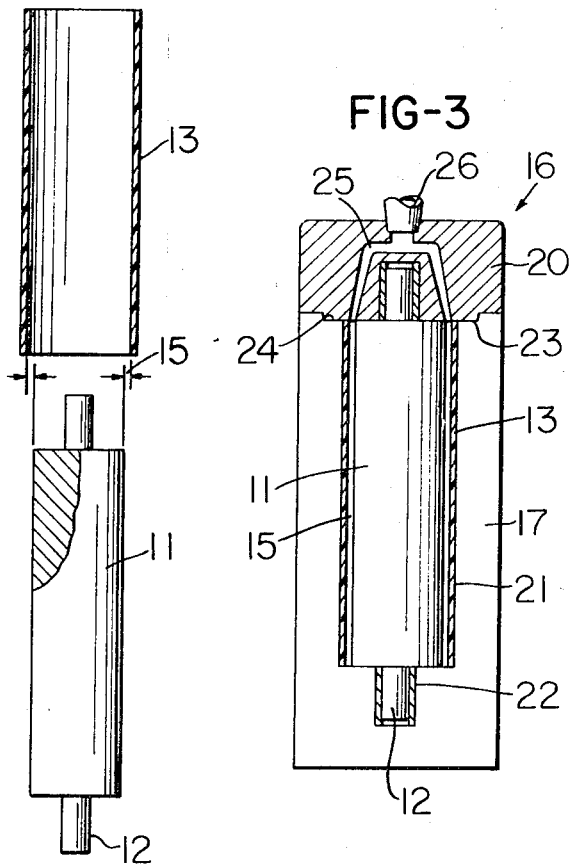

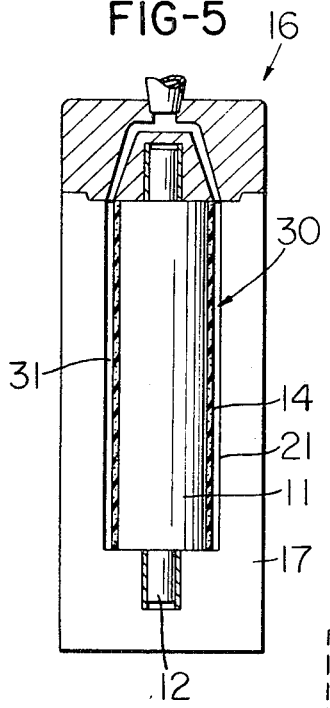
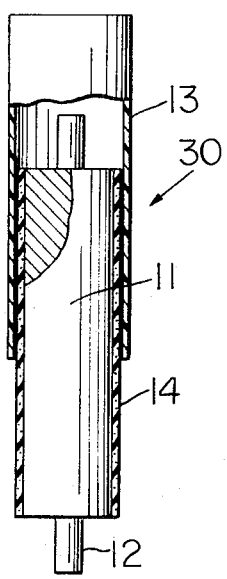
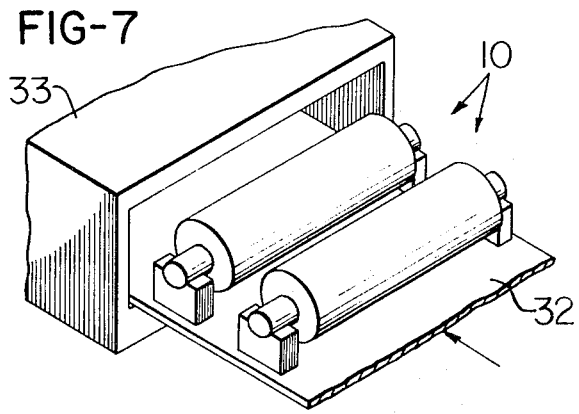

ROLLER STRUCTURE

BACKGROUND OF THE INVENTION

Because of the unique properties of certain plastic materials, such as nylon or the like, there are many industrial uses for rollers or rolls having sleevelike outer portions and associated cylindrical outer surfaces made of such plastic materials. These rolls have outside diameters ranging from roughly inches to 6 feet or more and lengths ranging from roughly 1 foot to 40 feet or more. However, it is difficult to provide rolls of the character mentioned so that their plastic outer surfaces are precisely made, free of defects, and not subject to distortion due to internal stresses in the adjoining plastic materials.

SUMMARY

This invention provides an economical precision roll having a substantially rigid core, an outer plastic sleeve free of defects and internal stresses, and filler means made of an elastic material and provided between the rigid core and outer plastic sleeve, whereby the plastic sleeve and filler means cooperate to enable the provision of a precision outside surface for the roll while assuring the outside surface has a resilient character.

Other details, uses, and advantages of this invention will become apparent as the following description of the embodiments thereof presented in the accompanying drawings proceeds.

BRIEF DESCRIPTION OF THE DRAWINGS

The accompanying drawings show present exemplary embodiments of this invention, in which FIG. 1 is a fragmentary view with parts in cross section illustrating an exemplary roll of this invention;

FIG. 2 is a view illustrating a preformed plastic sleeve prior to placing such sleeve in a position concentrically around an associated rigid core to define a cylindrical space therebetween;

FIG.. 3 is a view of the core and plastic sleeve of FIG. 2 supported in position within an associated mold which is utilized to enable introducing an elastic material in the cylindrical space between the core and the sleeve;

FIG. 4 is a block diagram presenting certain method steps which may be used to make the exemplary roll of FIG. 1;

FIG. 5 is a view of a rigid core having a resilient construction in the form of a tubular member fixed therearound to define an assembly with the assembly being supported in position within associated mold means to enable molding a plastic sleeve against the outside surface of the tubular member;

FIG. 6 is a view with parts in cross section and parts broken away illustrating a preformed plastic sleeve being axially slid over a rigid core having a resilient tubular member fixed thereon to enable such preformed plastic sleeve to be shrunk in position against the core and tubular member;

FIG. 7 is a perspective view with parts in cross section and parts broken away illustrating a plurality of rolls as assembled in FIG. 6 being moved by conveyor through an associated heating tunnel to heat shrink the outer plastic sleeve in position to define a completed roll; and FIG. 8 is a block diagram illustrating by solid blocks and solid interconnecting lines certain steps used in making a roll similar to the roll of FIG. 1 and illustrating by dotted lines and dotted blocks certain alternate steps which may be employed to make such similar roll.

DESCRIPTION OF ILLUSTRATED EMBODIMENTS

Reference is now made to FIG. 1 of the drawings, which illustrates one exemplary embodiment of a precision roller or roll 10 of this invention. The roll 10 comprises a substantially rigid unyielding core 11 which may be made of any suitable material such as metal and may be provided with a pair of oppositely arranged supporting shaft portions or shafts 12 extending outwardly from opposite ends of the core 11 for rotatably mounting the roll 10 on suitable supports and in a known manner. The shafts 12 may be provided as an integral part of the core 11 or fixed thereto using any suitable means.

The roll 10 has an outer sleeve 13 made of a plastic material and is provided with resilient filler means 14 having its inside surface means fixed against the core 11 and its outside surface means fixed against the inside surface of the sleeve 13. The filler means 14 may be formed in position either prior to or after the outer plastic sleeve 13 is placed concentrically around the core 11 and as will be described in detail subsequently.

Reference is now made to FIGS. 2–4 of the drawings for a more detailed presentation of one exemplary technique which may be used to form the roll 10 of this invention. In particular, the outer sleeve 13 is preferably preformed using any suitable technique such as by extrusion, static casting, centrifugal casting, fabrication from sheet or film, or the like and the preformed sleeve 13 is placed concentrically around the metal core 11 to define a cylindrical space 15 therebetween, see FIG. 2.

The core 11 and sleeve 13 are suitably supported in associated mold means, see FIG. 3, shown as a mold assembly 16, which is comprised of a lower mold member 17 and an upper mold member 20. The lower member 17 has a precisely formed right circular cylindrical bore 21 extending partially therein and a small diameter cylindrical bore 22 provided in the lower portion of member 17, which is adapted to precisely locate one of the shafts 12 extending from the central core 11. The upper member 20 has a projecting surface 23 extending therefrom which is adapted to be received in a cooperating recessed surface 24 provided in the lower member 17 to enable member 20 to be precisely located and fixed in position with respect to member 17, using any suitable means, so that the outside surface of the sleeve 13 will be supported against the cylindrical surface 21 and the shafts 12 will be precisely supported so that their longitudinal axes coincide with the longitudinal axis of the cylindrical surface 21.

The upper member 20 has opening means 25 of inverted substantially cup-shaped cross-sectional configuration and with members 17 and 20 of the mold 16 assembled together one end of the opening means 25 communicates with the annular space 15 between the metal core 11 and sleeve 13 and the opposite end of such opening means 25 communicates with a tube 26 fixed to the top portion of member 20. The tube 26 is used to introduce filler means in the form of an elastic material into the space 15. After introducing the elastic material in the space 15 the material is suitably cured using any suitable technique compatible with the particular material introduced in such space to define a tubular resilient construction 14 and during such curing the resilient construction is simultaneously bonded to the metal core 11 and to the sleeve 13 whereby the completed assembly is removed from the mold 16 and suitably cooled to define the completed roll 10.

Any suitable elastic material may be introduced in the cylindrical space 15 to define the tubular construction 14. Examples of materials which may be utilized are natural or synthetic rubber, polyurethane, expandable polystyrene, styrene, and foam rubber, for example.

The preformed plastic sleeve 13 may be inserted within the lower mold member 17 at room temperature; however, the hoop strength or prestressing of the outer sleeve 13 of the completed roll 10 may be controlled by preheating the preformed plastic sleeve 13 to a controlled temperature prior to introduction into the mold 16. It will also be appreciated that the mold 16 with the sleeve 13 in position therein may also be suitably preheated.

As previously explained, the lower member 17 may be provided with a precision right circular cylindrical surface 21 which may be used to define the configuration of the completed roll 10. However, where there is a need to provide the roll 10 with an outside surface which is substantially flawless and free of any defects, depressions, or the like, the roll 10 may be removed from the mold 16 and suitably machined, using an associated cutting machine such as a grinding machine, for example, to provide a right circular cylindrical surface having an axis which coincides with the axis of the core 11 while providing the desired finish on the outer surface of the sleeve 13.

The plastic material which is selected for the outer sleeve 13 will vary depending upon the intended use for the roll 10. In many applications it has been found that an outer sleeve 13 made of nylon provides an excellent wearing surface. Further, by backing the nylon sleeve 13 with tubular construction 14 made of an elastic material which is formed in position between the roll 10 and the sleeve 13 the outer surface of the roll 10 is provided with a precision surface having a controlled resiliency. It will also be appreciated the materials utilized to define the integral tubular construction 14 and the outer sleeve 13 may be properly selected and matched to define a roll having the desired properties.

Another exemplary technique which may be utilized to define a roll substantially identical to the roll 10 illustrated in FIG. 1 is presented in FIG. 5 and by the blocks of solid outline and solid interconnecting lines shown in FIG. 8. Accordingly, for ease of presentation the completed roll, made as shown in FIG. 5, will be given the reference numeral 10 and the various component parts of such roll will be given the same reference numerals as corresponding parts of the roll 10 shown in FIG. 1.

In particular, it will be seen from FIG. 5 that a metal core 11 is provided and has filler means made of an elastic material which is in the form of a tubular construction 14 which is fixed in position against the metal core 11. The resilient tubular construction 14 is fixed in position against the metal core 11 to define an assembly which will be designated by the reference numeral 30 and the assembly is placed in the mold 16 so that in this instance the cylindrical surface 21 of the lower mold member 17 defines a cylindrical space 31 between the resilient tubular construction 14 and the surface 21. A plastic material is then introduced into the cylindrical space 31 to form a plastic sleeve 13 against the resilient tubular construction 14. The plastic material is then cured in position against the tubular construction 14 to define the completed roll 10.

The plastic material which is introduced into the space 31 may be any suitable plastic material depending upon the characteristics desired for the outer plastic sleeve 13 of the completed roll 10. It has been found that the outer sleeve 13 may be made by casting nylon in the space 31.

Ordinarily, it is extremely difficult to cast nylon around a substantially rigid roll or core, such as the metal core 11, because of a tendency for the nylon to set up high internal stresses during the curing thereof. However, by casting nylon in the space 31 the resilient character of the tubular construction 14 provides substantial yielding which is effective in eliminating internal stresses normally created within the nylon during the cooling thereof. Thus, this technique is effective in providing a completed roll 10 having an outer nylon sleeve 13 which is free of internal stresses.

Any suitable material may be utilized to define the tubular construction 14 and it will be appreciated that an elastic material which is insensitive to attack during the casting of the plastic material therearound should be selected. In particular, when casting nylon, the tubular construction 14 is preferably made of a material which will not be attacked by the nylon monomer and typical materials are silicone rubber, fluorocarbon resins, polycarbonates, etc. It will also be appreciated that this technique enables the casting of an integral nylon sleeve 13 having an exceptionally thin wall.

Another exemplary technique which may be utilized to define a roll substantially identical to the roll 10 illustrated in FIG. 1 is presented in FIGS. 6, 7, and the presentation shown by blocks of dotted outline connected by dotted lines in FIG. 8. As previously, and for ease of presentation, the roll shown in FIG. 7 will be designated by the reference numeral 10 and its component portions (shown in FIG. 6) will be given the same reference numerals as corresponding portions of the roll 10 of FIG. 1.

In particular, it will be seen that a tubular construction 14 made of elastic filler means 14 in the form of a tubular construction is fixed in position against the metal core 11 to define the assembly 30 which is substantially identical to the assembly 30 illustrated in FIG. 5. A preformed plastic sleeve 13 is then placed concentrically around the assembly 30, essentially as illustrated in FIG. 6, so that the sleeve 13 has its opposite ends aligned with the associated ends of the core 11 and tubular construction 14. The preformed plastic sleeve 13 is then fixed in position against the outside surface of the tubular construction 14 by shrink fitting.

Any suitable shrink fitting technique may be utilized; however, in this example of the invention the sleeve 13 is heat shrunk in position by supporting a plurality of rolls 10 on a conveyor 32 which passes through a heated environment such as a heat shrinking tunnel 33, whereby the sleeve 13 is heat shrunk tightly in position against the tubular construction 14 to define the completed roll 10. The shrink tunnel 33 may be of any suitable construction and hence will not be described in detail. Further, it will be appreciated that any other suitable technique may be used to heat shrink the sleeve in position.

Thus, the completed roll 10, formed as shown in FIGS. 6 and 7, is essentially of a unitary construction having the resilient tubular construction 14 suitably bonded against the inner metal core 11 and the inside surface of the tubular sleeve is heat shrunk and bonded to the outside surface of the tubular construction 14. It will also be appreciated that the materials utilized for the resilient tubular construction 14 and for the plastic sleeve 13 are such that the tubular sleeve 13 will be suitably heat shrunk in position while maintaining the resilient construction 14 substantially intact, i.e., without adversely affecting the characteristics of such tubular construction.

The tubular plastic sleeve 13 which is fixed in position by heat shrinking to define the roll 10 may be made using any suitable technique. For example, such sleeve may also be made by extrusion, static casting, centrifugal casting, fabrication from sheet or film, or similar processes.

As explained earlier, nylon has been used successfully to make the outer sleeve of the precision roll of this invention. A fluorocarbon resin of the type sold under the trade name of Teflon by the E. I. Du Pont de Nemours and Co., Inc., of Wilmington, Delaware, has also been used; however, as previously indicated any suitable plastic material may be used for such sleeve, depending on the intended use of the roll 10.

The outer sleeve 13 of the completed roll 10 may be of any suitable thickness ranging from roughly 0.002 inch to a thickness approaching the radius of such roll.

While present exemplary embodiments of this invention have been illustrated and described, it will be recognized that this invention may be otherwise variously embodied and practiced by those skilled in the art.

What is claimed is:

1. A precision roll comprising, a substantially rigid unyielding core, an outer cylindrical sleeve made of nylon and integral tubular filler means made of an elastic material, said filler means having its inside surface means fixed against said core and its outside surface means fixed against said nylon sleeve, said nylon sleeve and tubular filler means cooperating to enable the provision of a precision outside surface for said roll while assuring said outside surface has a resilient character, said filler means comprising a foamed polyurethane which is provided between said core and said nylon outer sleeve, said nylon sleeve being in the form of a cast nylon sleeve which is free of internal stresses and said tubular filler means is of a yielding character which yields substantially upon cooling said nylon sleeve which has been cast thereagainst to assure said sleeve stress free.

2. A roll as set forth in claim 1 in which said core comprises a metal core.

* * * * *